United States Patent [19]
Le Compte, Jr. et al.

[11] 3,893,924
[45] July 8, 1975

[54] AEROBIC LAGOON WASTE TREATMENT SYSTEM AND METHOD

[75] Inventors: Archie R. Le Compte, Jr., Neenah; David W. Appel, Oshkosh, both of Wis.

[73] Assignee: Kimberly-Clark Corporation, Neenah, Wis.

[22] Filed: Oct. 19, 1973

[21] Appl. No.: 407,922

[52] U.S. Cl. .................. 210/220; 210/14; 261/28; 261/124
[51] Int. Cl. ............................................. C02c 1/12
[58] Field of Search .................. 210/14, 15, 220, 8; 261/28, 121 R, 123, 124, DIG. 47; 61/1

[56] References Cited
UNITED STATES PATENTS

| | | | |
|---|---|---|---|
| 2,438,342 | 3/1948 | Mallory | 210/14 |
| 2,479,403 | 8/1949 | Powers | 210/14 X |
| 3,220,706 | 11/1965 | Valdespino | 261/124 X |
| 3,336,016 | 8/1967 | Schreiber | 210/14 X |
| 3,622,132 | 11/1971 | Rawlings, Jr. | 261/DIG. 47 |
| 3,683,627 | 8/1972 | Girden | 261/123 X |

Primary Examiner—Charles N. Hart
Assistant Examiner—Robert H. Spitzer
Attorney, Agent, or Firm—Daniel J. Hanlon, Jr.; William D. Herrick; Raymond J. Miller

[57] ABSTRACT

Highly efficient system and method for effectively treating liquids containing waste materials are disclosed. A basin or lagoon is operated aerobically by the use of jets arranged so as to set up cells of complementary primary circulation with resulting secondary circulation patterns sufficient to substantially prevent solids from settling out except, when desired, in a settling zone. Power requirements are reduced to a fraction of that required for conventional surface aerated or diffuser aerated lagoons equipped to operate aerobically.

6 Claims, 5 Drawing Figures

AEROBIC LAGOON WASTE TREATMENT SYSTEM AND METHOD

BACKGROUND OF THE INVENTION

1. Field of the Invention

This invention relates generally to systems and methods for the treatment of waste-containing liquids for the removal of $B.O.D._5$ (five-day biochemical oxygen demand defined as the oxygen required by the bacteria which metabolize the waste) and suspended solids. More specifically, this invention is related to such systems and methods that entail the use of lagoons or relatively large bodies of liquid and means for aerating the same. In particular, the present invention pertains to such bodies of liquid that are designed to form a complete treatment system for liquids of relatively low waste loadings or a secondary system for the treatment of more heavily loaded waste-containing liquids that have been subjected to primary treatment. While it will be apparent to those of ordinary skill in this art that, with minor modifications, the present invention will find application in diverse waste treatment systems, in its preferred embodiment the invention is directed primarily to aerated aerobic lagoons.

2. Description of the Prior Art

In a number of conventional processes for the treatment of liquids containing pollutional material it is common to accumulate such liquids in the form of relatively large ponds or lakes. For the purposes of the present description such bodies shall be referred to as "lagoons", and that term shall include natural or artificial ponds or basins. Generally, these lagoons are shallow, having depths within a range of from about 5 to about 20 feet depending upon the particular waste treatment system involved. The purpose for using lagoons is to provide for aeration of the waste and removal of $B.O.D._5$ and in some cases for settling of waste solids. Where the $B.O.D._5$ loading of the waste material is not too high, aeration may be accomplished simply by exposure of the large surface area of the lagoon to the atmosphere. In places where this simple form of aeration is not adequate, however, additional aeration must be provided. This may be accomplished by placing various devices on or within the liquid to force air or other oxidizing fluid into it. Such lagoons are referred to as "aerated lagoons" and are exemplified by U.S. Pat. No. 3,485,750 to Albertson and U.S. Pat. No. 3,033,372 to Riddick.

A problem associated with aerated lagoons, in general, is the increased buildup of sludge material per unit area due to the higher rate of oxidation compared to simple lagoons. Thus, aerated lagoons must be frequently dredged to remove this sludge which may necessitate the shutdown of the system or provision for an alternate lagoon to take the place of the one being dredged. To overcome this problem various lagoon designs have been developed such as that shown in U.S. Pat. No. 3,234,123 to Hinde where a portion of the lagoon is made deeper for sludge accumulation to reduce the frequency of dredging.

An alternative means to alleviate the sludge removal problem has been to provide sufficient circulation within the lagoon to maintain the solids in suspension so that very little settling out occurs within the lagoon. Usually, the effluent from these systems is directed to a polishing pond or settling zone where the sludge is settled out. Necessity for sludge removal is thus confined to the polishing pond or settling zone. These lagoons are referred to as aerobic lagoons by some sources since the increased circulation is accompanied by more intimate contact between bacteria and substrate, therefore a higher rate of oxidation. In some cases provision is made for rapidly returning at least a portion of the settled sludge to the aerobic lagoon, thus forming an activated sludge system.

However, where it is desired to maintain settleable solids in suspension, it has heretofore been considered necessary to provide power substantially in excess of that necessary to aerate the liquid or to operate at reduced detention times. Thus, in its Technical Bulletin No. 245 (June 20, 1971) entitled "A Study of Mixing Characteristics of Aerated Stabilization Basins" on page 61, the National Council of the Paper Industry for Air and Stream Improvement, Inc. suggests a minimum power input of 14 Hp per million gallons before consideration should be given to reduced detention times to prevent solids from settling out.

SUMMARY OF THE INVENTION

In accordance with the invention, it has been found that by the selection and placement of specific types of aerators it is possible to operate an aerobic lagoon at a fraction of the power requirements heretofore thought necessary. The system of the present invention includes the use of jets placed within the liquid and directed so as to form primary circulation cells having an average velocity of at least about 0.3 foot per second and secondary circulation within the cells sufficient to substantially prevent solids which have been subjected to primary separation from settling out. The flow within the cells is designed to be complementary to adjacent cells and create a serpentine path from inflow to outflow of the lagoon. a quiescent zone may be provided within the lagoon for sludge settling, or a separate polishing pond may be utilized. The resulting aerobic lagoon provides highly effective treatment at very low power inputs with an option of controlled sludge deposition.

BRIEF DESCRIPTION OF THE DRAWINGS

Other objects and advantages of the invention will become apparent upon reading the following detailed description and upon reference to the drawings, in which.

DESCRIPTION OF THE PREFERRED EMBODIMENTS

While the invention will be described in connection with the preferred embodiments, it will be understood that it is not intended to limit the invention to these embodiments. On the contrary, it is intended to cover all alternatives, modifications, and equivalents as may be included within the spirit and scope of the invention as defined by the appended claims.

Figure 1:
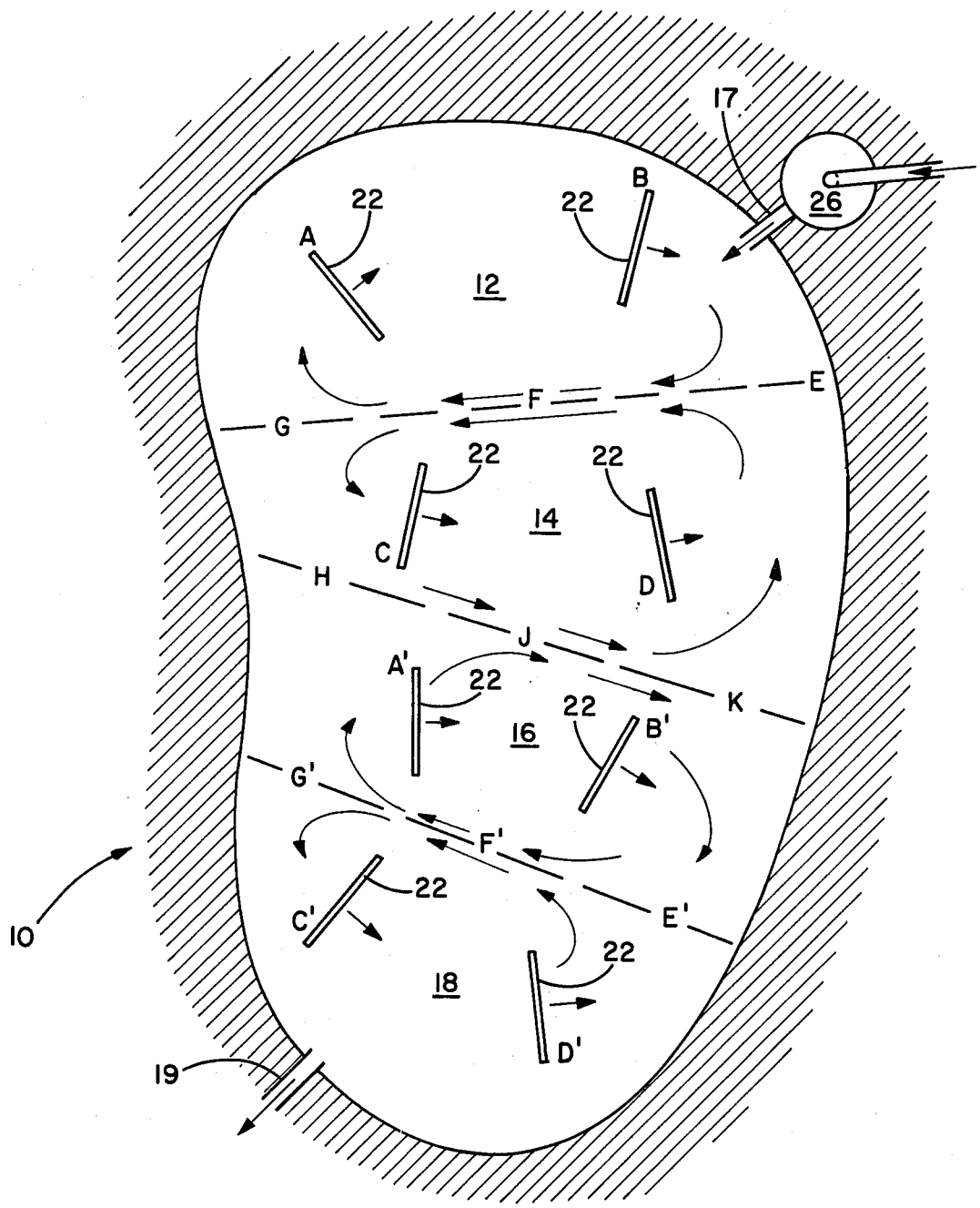
FIG. 1 is an overall top view of an aerated lagoon constructed in accordance with the present invention showing primary circulation patterns.

Turning to the drawings and FIG. 1 in particular, there is illustrated therein a lagoon constructed in accordance with the present invention. The lagoon, generally designated 10, includes four circulation cells 12, 14, 16 and 18 as well as inflow 17 and exit 19. Inflow may receive primary treatment at clarifier 26, if settleable solids require removal. Unidirectional jet aerators 20 (FIG. 5) are arranged on manifolds generally indicated at 22 which supply air and a portion of the lagoon liquid from submerged centrifugal pump 24 (FIG. 4) located near the end of the manifold 22. Jet aerators suitable for use in the present invention include Model 100JA manufactured by Penberthy Division, Houdaille Industries. They are devices that mix air and liquid flows to produce a jet-like stream including fine bubbles. Reference may be had to U.S. Pat. No. 2,479,403 for a description of ejector aerators which can be utilized. While the use of air/liquid jet aerators is believed to be most efficient and is, therefore, preferred, the use of liquid ejectors along with separate gas diffusers or other aeration devices is also contemplated. The primary circulation patterns are shown in FIG. 1 by arrows as indicated A, B, F, A in cell 12; C, D, F, C in cell 14; A', B', F', A' in cell 16; and C', D', F', C' in cell 18.

Figure 2:
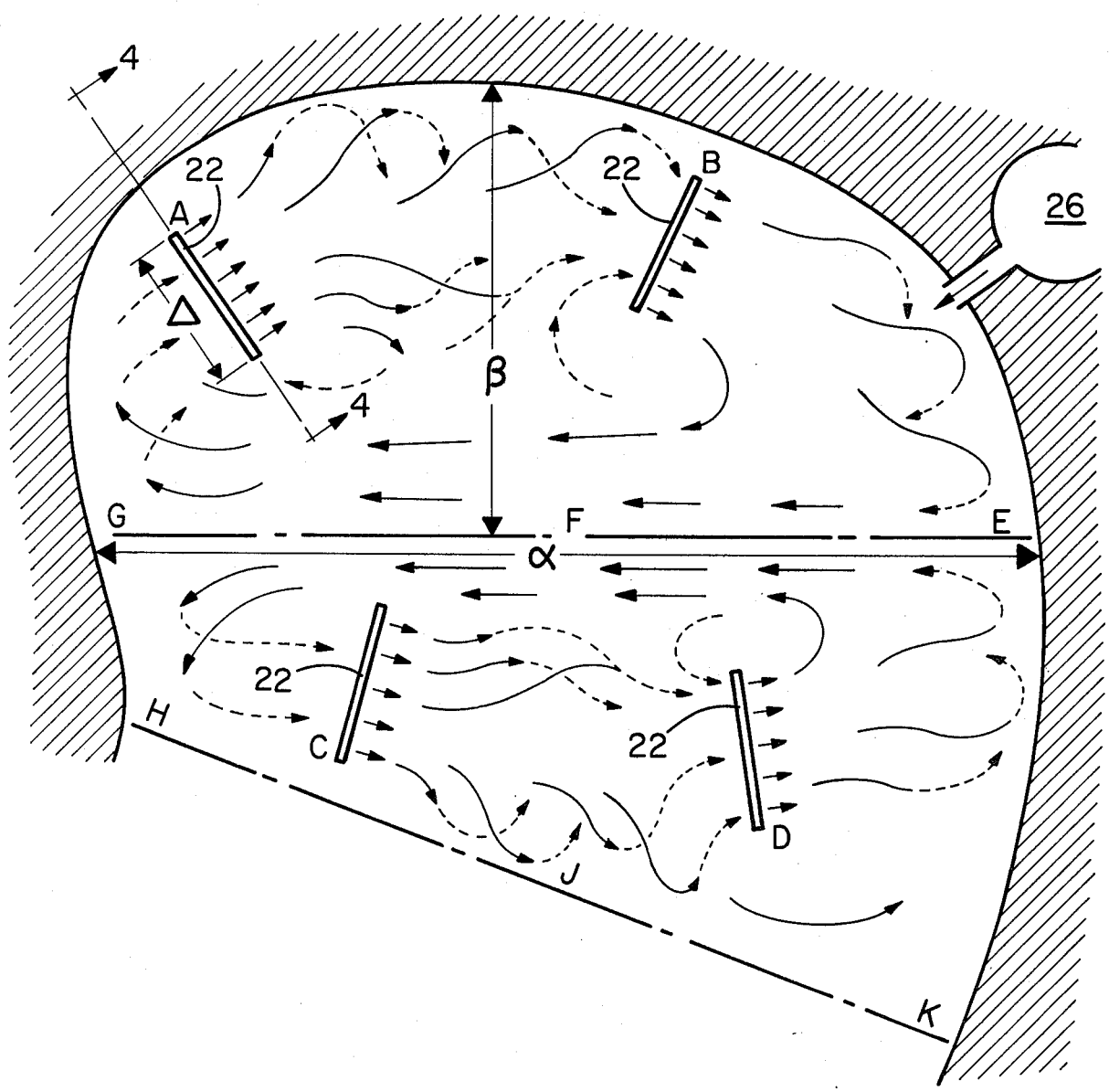
FIG. 2 is an enlarged view of two of the cells of the lagoon of FIG. 1 showing primary and secondary circulation patterns.

Turning to FIG. 2, although points E and G, for example, are stagnation regions of the primary flow on the border shown diagrammatically as dashed line E, F, G, between circulation cells, the system of the present invention results in secondary flows as indicated by broken arrows which have a strong influence and keep these zones active in a regular and complementary manner. In contrast, surface aerator systems and rising bubble systems present areas between aerators at the confluence of zones of influence that are quite stagnant particularly along the lagoon bottom where deposits naturally accumulate.

Figure 4:
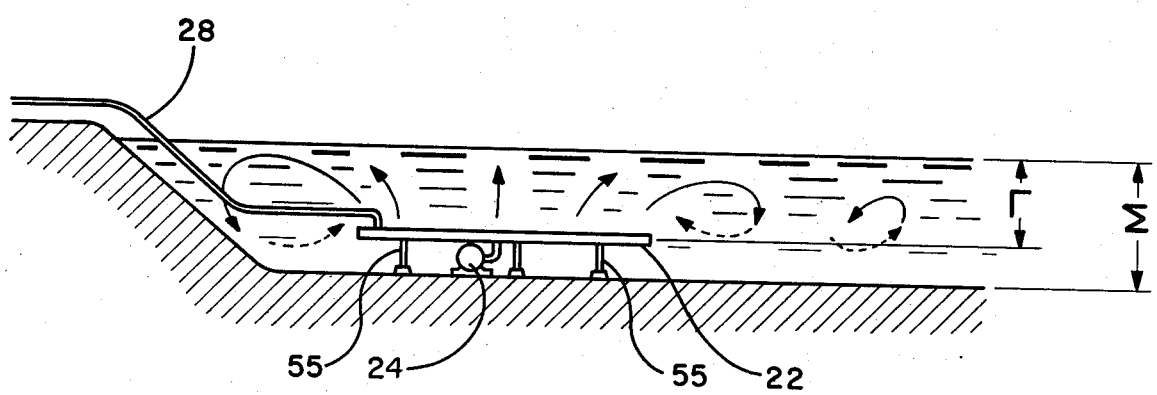
FIG. 4 is a section taken along lines 4—4 of FIG. 2.

While it is not intended that the present invention be limited to any particular theory, it is believed that the forces creating the secondary flow are due to the curvature of the primary flow at the ends of the cells. The flow at the free surface, since it has a higher velocity, moves outward toward the border of the lagoon and induces an inward flow along the bottom as illustrated in FIG. 4. The difference in primary flow velocity at the surface and at the bottom is due essentially to viscous boundary resistance, but it is also augmented by the rise of gas laden buoyant flow from the manifold ahead of the bend such as that shown in FIG. 4 wherein manifold 54 is shown positioned by supports 55. Thus, the secondary flow assumes a helical direction and is supported by both buoyant forces and differential momentum resulting from friction. To take maximum advantage of these effects it is preferred that the manifold should be located near the bottom and a sufficient distance away from the bend in flow to allow the buoyant effect of rising oxygen-containing gas to lift the main momentum of the jet flow off of the bottom and up to the upper portion of the lagoon.

The return flows E, F, G, in cells 12 and 14; and E', F', G' in cells 16 and 18 result from the disposition of the manifolds 22. While the areas at G and G' are zones of stagnation for these return flows, again the momentum of the surface flow is greater than for the flow along the bottom, and a vertical circulation results so that the bottom velocity along the border of the lagoon in these regions is inward and toward the ingoing sides of the adjacent manifold. To take maximum advantage of this secondary flow, manifolds 22 preferably are kept close to the border regions G and G' to minimize the stagnation areas and accentuate the secondary flow due to the high momentum of the surface flow. However, the exact placement of the manifolds 22 is not critical and considerable variation in cell geometry can be accommodated giving regard to these factors.

Figure 3:
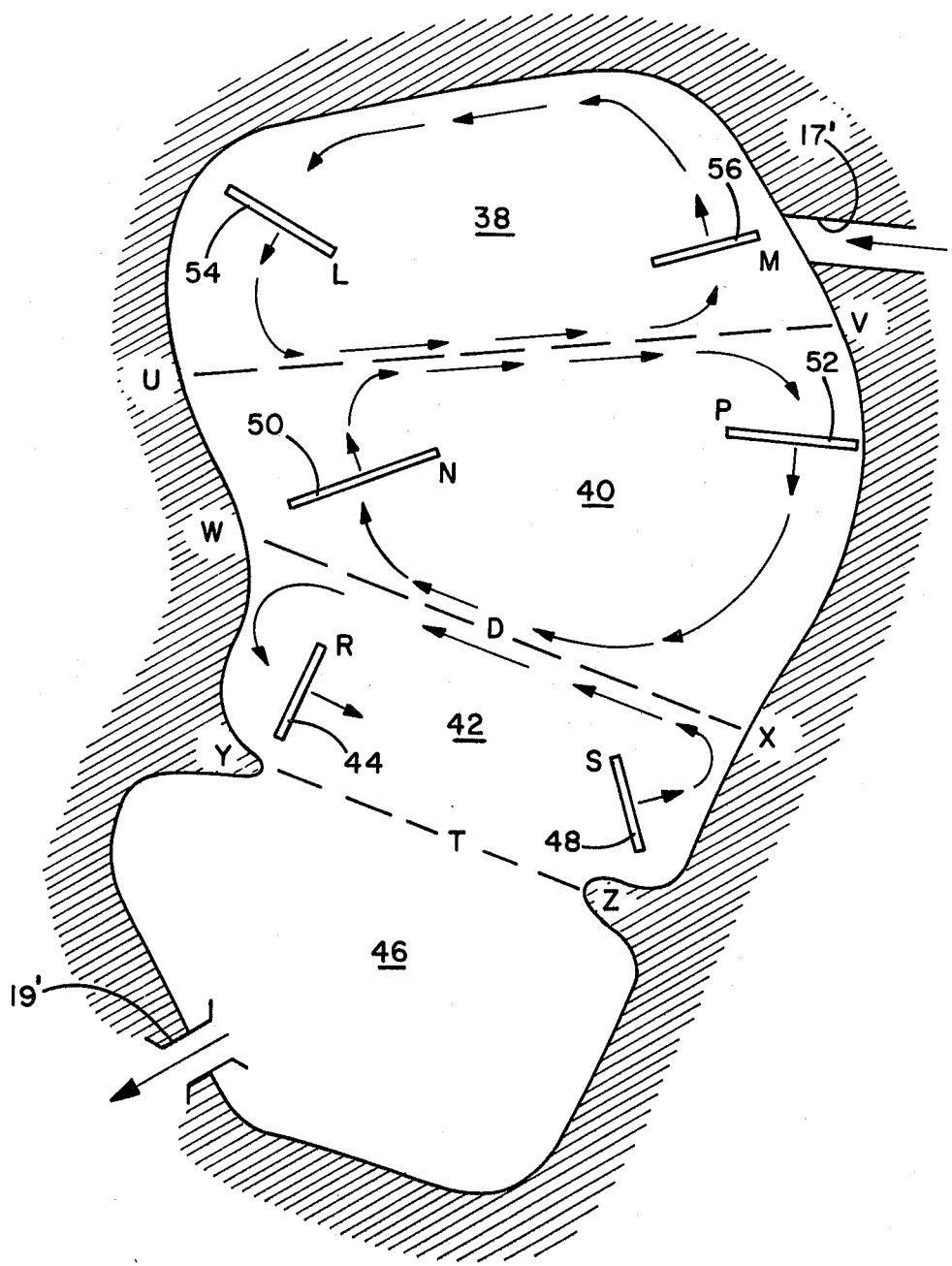
FIG. 3 is a view like that of FIG. 1 illustrating an alternative embodiment providing a quiescent zone.

An alternative embodiment is shown in FIG. 3 which provides for a quiescent zone 46 or settling basin for localized solids deposition. Three circulation cells 38, 40, 42 are illustrated having complementary circulation patterns L, M; N, P, Q; and R, T, S, respectively with border regions UV; WX; and YZ providing flow from inflow 17' to exit 19' as described above with reference to FIG. 1. However, in this case manifold 44 is preferably placed so as to direct flow across cell 42 parallel to the border line YZ between the cell and quiescent zone 46. Manifold 48 is preferably placed so as to draw flow generated by manifold 44 into counterclockwise flow pattern RTS. It is also preferably oriented with respect to manifolds 50, 52 so that there is opposition to flow at X. Flow is thereby forced along the dividing line indicated schematically in the direction XQW. The manifolds are otherwise designed and placed as previously described with reference to FIG. 1 as are manifolds 54, 56 in cell 38. Protrusion of the embankment at Y and Z is preferred to further guide and control the cell circulation and minimize interaction with the settling basin. In general, the more extensive the protrusion, the more effective will be the hydraulic isolation. Available material and cost will govern the extent of each protrusion, but is is preferred that they extend at least one tenth the basin width on each side.

Figure 5:
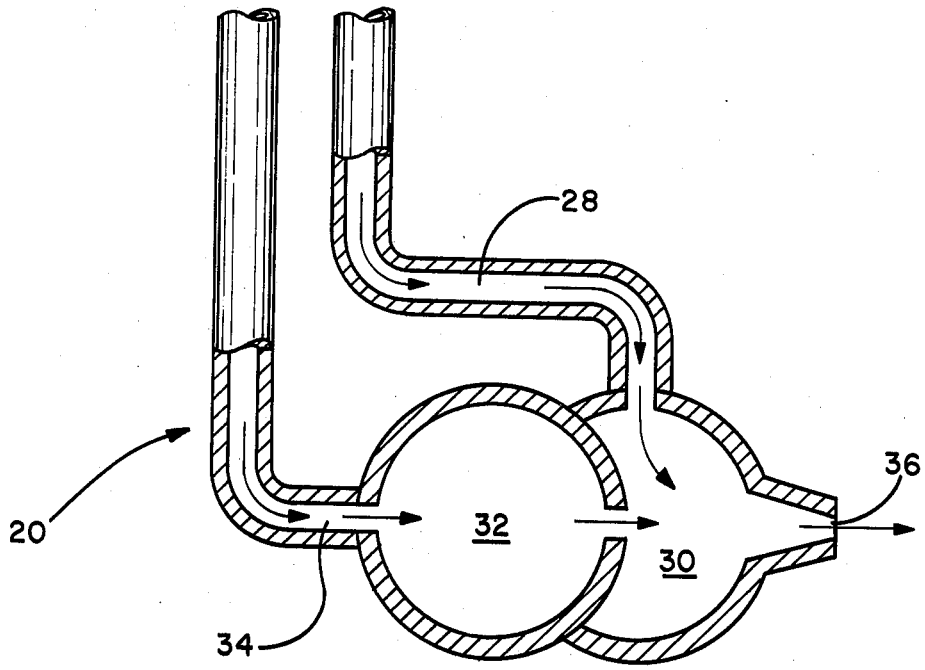
FIG. 5 schematically illustrates an example of a jet manifold.

FIG. 5 illustrates a representative manifold construction although it will be apparent that various alternative structures can be employed as well. As shown, conduit 28 from a source of oxygen-containing gas (not shown), e.g. a blower, provides the gas for manifold 30. Pump 24 provides liquid to manifold 32 through conduit 34. The gas and liquid are mixed within manifold 30 and driven through nozzle 36 as a jet stream containing fine bubbles. The number of jets per manifold as well as the specific size of the jets will, of course, depend on the characteristics of the waste treatment system being designed.

Referring again to FIGS. 2 and 4, the geometric variables which are most essential to the system and method of the present invention are cell length $\alpha$, width $\beta$, and liquid depth $\Sigma$. Also, to be considered are the manifold length $\Delta$ and the depth of submergence $\Gamma$. Natural lagoon configuration and economics are important factors which often will dictate the number of manifolds and cells. However, certain general limitations for preferred economical systems can be given. In accordance with the invention, the ratio of cell width, $\beta$ to lagoon depth is in the range of from about 4 to about 50 and, preferably between 10 and 30. A minimum of two manifolds per cell are necessary and often most economical. For this case, $\alpha/\beta$ should be between 1 and at most 3, and preferably about 2. $\Delta/\beta$ should be between 0.25 and 0.45 and $\Gamma/\Sigma$ should be greater than 0.5, preferably 0.8 or more, both for good oxygen transfer and strong secondary circulation. The upper limit of this parameter is governed by the maximum velocity that can be allowed at the floor of the lagoon from the expanding jet flows without scouring the bottom. In the two-manifold cell, one manifold should be directed toward a border stagnation zone and be a distance of at least 5 times the depth of the lagoon away from the border. It will be necessary for it also to be at least one manifold length $\Delta$ away from the border. The other manifold is preferably directed away from a border stagnation zone and is no more than one manifold length $\Delta$ away.

When more than two manifolds are utilized in a cell as may be desired in certain cases for increased oxidation or to prevent settling, additional manifolds are preferably placed in line with the two manifolds as previously described and directed so as to maintain the primary flow pattern. Additional manifolds are preferably utilized when the cell length, $\alpha$, to cell width, $\beta$, ratio is greater than two and particularly when it is greater than 4. In such cases, the total number of manifolds used is preferably about equal to the $\alpha/\beta$ ratio.

In general, the pattern of primary flow in a cell may be considered like that of a large horizontally mounted wheel. The secondary flows follow horizontal toroidal closed-rings, each like a classical smoke ring, with the adjacent flows complementing each other. This concept is shown schematically in section by FIG. 4.

There are three major factors contributing to the impedance in lagoon circulation: boundary friction, form loss due to the bends, and the drag introduced by the manifold piping. The boundary friction loss may be estimated by using Kutter's $n=0.022$ as described by Chow, V. T. "Open-Channel Hydraulics" (1959) p. 112, Table 5-6 C.a.2. As an example, estimates for a cell having overall dimensions of 1200 feet by 700 feet may be made by considering weathered excavated earth channels of straight alignment, an average circulation path length of 2200 feet and a hydraulic radius equal to the lagoon depth, 18 feet, as is appropriate for a wide flow. The resulting friction loss coefficient is 0.65.

The loss due to bends is more difficult to estimate. One reference suggests for highly meandering natural streams, an increase in friction loss coefficient of 30% to account for bends. This would be an added loss coefficient of 0.20. However, extrapolation of laboratory data from Chow, supra, indicates that the loss coefficient for 180° bends could be as high as 1.0 per bend. Using the higher value, although considered somewhat excessive, results in a total bend loss coefficient of 2.00.

The loss due to manifold obstruction is based on a projected area to the flow of 300 square feet per manifold and a drag coefficient of 1.2 as defined by Rouse, Hunter "Engineering Hydraulics", p. 124, FIG. 90. The loss coefficient due to the two manifolds, then, is 0.13 and is almost negligible.

The total system loss coefficient for a cell having two manifolds, then, is obtained from the sum of the respective coefficients:

| Friction | 0.65 |
|---|---|
| Bends | 2.00 |
| Manifolds | 0.13 |
| Total | 2.78 |

As a specific example, an active lagoon area generally illustrated in FIG. 3 of 65 acres having an 18 ft. depth constructed in accordance with the invention requires 6 manifolds each having 64 Penberthy Model 100JA ejectors and a length of 260 feet requiring a total of 912 horsepower in both water pumps and air blowers (in this case about equally divided) to give an average circulation velocity of ⅓ ft. per second which has been shown to be sufficient to keep fine solids in suspension. The power density installed in this case is 3.5 hp per million gallons.

These calculations are based on jet nozzle area of 0.0218 ft.$^2$, water flow per jet of 100 gallons per minute and air flow per jet of 28.125 standard cubic feet per minute. Submerging the jets to a depth of 15 feet in water gives an air flow of 0.357 cubic foot per second and an air weight rate of 0.0368 lb. per second. Corresponding water flow values are 0.2228 cubic foot per second and 13.90 lbs. per second. At these rates, a single jet discharge velocity value of 26.60 feet per second is obtained with a jet plume density of 24.037 lbs. per cubic foot. The jet force, therefore, is (flow rate) (density) (velocity) divided by gravity acceleration of 11.51 lbs./jet. For a manifold of 64 jets the total is 736.8 lbs. which results in a motive force per cell (water head, H) of 0.00436 foot.

Using these calculations the velocity of circulation may be determined since the total loss coefficient, $$k = H \left(\frac{V^2}{2g}\right), \text{ or } V^2 = \frac{2gH}{k} = 0.101.$$

Taking the square root, $V=0.32$ foot per second, adequate for circulating solids at the low power input above described.

By comparison, surface aerators which maintain solids in suspension at comparable velocities within their zones of complete mix will deposit solids at the interfaces of zones of influence where their induced currents are reversed in multiple aerator installations. In such cases, surface aerators require a power density of 14 to 15 hp per million gallons to keep settleable solids in suspension. Thus, the method and system of the present invention provides manifold savings in terms of required horsepower.

While the invention has been described in conjunction with specific embodiments thereof, it is evident that many alternatives, modifications and variations will be apparent to those skilled in the art in light of the foregoing description. For example, it may be desired to operate the system as an activated sludge system in which case it will be necessary to provide for the rapid and generally continuous return of sludge to the aeration zone. It is intended to embrace these and all other such alternatives, modifications and variations as fall within the spirit and broad scope of the intended claims.

We claim:

1. Aerobic waste treatment system comprising, in combination,
   a. a lagoon for receiving waste-containing liquids, said lagoon including at least one circulation cell having a length, $\alpha$, width, $\beta$, and liquid depth, $\Sigma$; and
   b. unidirectional ejector manifolds having a length, $\Delta$, positioned at a plurality of locations within said cell at a depth, $\Gamma$, in said receiving means and wherein the ejectors are substantially horizontally directed to induce a primary circulation pattern around each cell having an average velocity of at least about 0.3 foot per second and a helical secondary circulation pattern within said cell so as to substantially reduce the tendency of solids to settle within said cell and form sludge; wherein $\alpha/\beta$ is between 1 and 3, $\Delta/\beta$ is between 0.25 and 0.45, and $\Gamma/\Sigma$ is greater than 0.5.

2. The system of claim 1 wherein a plurality of cells are included having complementary primary circulation patterns.

3. The system of claim 2 further including means for settling said solids outside of said cells.

4. The system of claim 1 wherein the lagoon has a liquid depth, $\Sigma$, in the range of from about 5 to about 20 feet and wherein $\alpha/\Sigma$ is in the range of from about 4 to about 50.

5. The system of claim 4 wherein at least some of said ejectors are air-liquid ejectors and serve also as means for adding oxygen.

6. The system of claim 5 wherein said ejector banks are placed near the bottom of said lagoon so that the buoyant effect of bubbles issuing from the ejectors aids the formation of said secondary circulation patterns.

* * * * *